(12) United States Patent
Welch

(10) Patent No.: US 8,696,035 B2
(45) Date of Patent: Apr. 15, 2014

(54) VENTURI ADAPTER

(75) Inventor: Jason Cristoffer Welch, Grandview, MO (US)

(73) Assignee: BHA Altair, LLC, Franklin, TN (US)

( * ) Notice: Subject to any disclaimer, the term of this patent is extended or adjusted under 35 U.S.C. 154(b) by 466 days.

(21) Appl. No.: 12/913,244

(22) Filed: Oct. 27, 2010

(65) Prior Publication Data

US 2012/0104748 A1 May 3, 2012

(51) Int. Cl.
*F16L 21/00* (2006.01)

(52) U.S. Cl.
USPC .......... 285/237; 285/148.23; 285/148.18; 285/235; 55/385.3

(58) Field of Classification Search
USPC ........ 285/148.23–148.27, 148.18, 903, 235, 285/236, 7, 123.15, 123.16, 148.22, 224, 285/225, 226, 229, 230, 237, 94; 277/315, 277/634, 635, 636, 631, 314; 248/56, 363; 174/153 G, 152 G; D23/209, 260–261; 55/385.2–385.3; D25/199, 260–261; 138/96 R, 94, 91, 90, 103, 108, 109

See application file for complete search history.

(56) References Cited

U.S. PATENT DOCUMENTS

| | | | |
|---|---|---|---|
| 1,012,122 A | 12/1911 | Budil | |
| 1,847,368 A | 3/1932 | Wendler | |
| 2,308,309 A | 1/1943 | Ruemelin et al. | |
| 2,335,315 A | 11/1943 | Seymour | |
| 2,503,568 A | 4/1950 | Timm | |
| 2,927,659 A | 3/1960 | Pabst et al. | |
| 2,952,332 A | 9/1960 | Metro | |
| 2,981,368 A | 4/1961 | Johnson | |
| 3,167,415 A | 1/1965 | Edwards | |
| 3,360,907 A | 1/1968 | Clark, Jr. et al. | |
| 3,421,295 A | 1/1969 | Swift et al. | |
| 3,524,304 A | 8/1970 | Wittemeier et al. | |
| 3,550,359 A | 12/1970 | Fisher et al. | |
| 3,716,436 A | 2/1973 | Pall et al. | |
| 3,747,605 A | 7/1973 | Cook | |
| 3,765,152 A | 10/1973 | Pausch | |
| 3,774,458 A | 11/1973 | Kitai et al. | |
| 3,774,769 A | 11/1973 | Smith | |
| 3,791,111 A | 2/1974 | Kroll | |
| 3,826,066 A | 7/1974 | Higgins | |
| 3,830,042 A | 8/1974 | MacDonnell | |
| 3,837,151 A | 9/1974 | Jensen | |
| 3,853,509 A | 12/1974 | Leliaert | |
| 3,856,489 A | 12/1974 | Vokral | |
| 3,876,402 A | 4/1975 | Bundy et al. | |
| 3,942,962 A | 3/1976 | Duyckinck | |
| 4,073,632 A | 2/1978 | Reinauer et al. | |

(Continued)

FOREIGN PATENT DOCUMENTS

| | | |
|---|---|---|
| DE | 48891 C | 10/1889 |
| DE | 1191078 B | 4/1965 |

(Continued)

*Primary Examiner* — James Hewitt
*Assistant Examiner* — Jay R Ripley
(74) *Attorney, Agent, or Firm* — Reinhart Boerner Van Deuren P.C.

(57) ABSTRACT

A venturi adapter is provided and includes a first collar having an inward projection, a second collar having an outward projection and a shoulder defining an aperture extending between opposing axial faces thereof and having an axial projection, the first and second collars extending in opposing axial directions from the shoulder.

13 Claims, 2 Drawing Sheets

(56) References Cited

U.S. PATENT DOCUMENTS

| | | |
|---|---|---|
| 4,138,234 A | 2/1979 | Kubesa |
| 4,174,204 A | 11/1979 | Chase |
| 4,187,091 A | 2/1980 | Durre et al. |
| 4,218,227 A | 8/1980 | Frey |
| 4,247,314 A | 1/1981 | Smoluchowski et al. |
| 4,256,473 A | 3/1981 | De Martino |
| 4,270,935 A | 6/1981 | Reinauer |
| 4,272,263 A | 6/1981 | Hancock |
| 4,276,069 A | 6/1981 | Miller |
| 4,291,904 A | 9/1981 | Iversen et al. |
| 4,292,057 A | 9/1981 | Ulvestad et al. |
| 4,319,897 A | 3/1982 | Labadie |
| 4,322,231 A | 3/1982 | Hilzendeger et al. |
| 4,344,781 A | 8/1982 | Higgins et al. |
| 4,424,070 A | 1/1984 | Robinson |
| 4,436,536 A | 3/1984 | Robinson |
| 4,443,237 A | 4/1984 | Ulvestad |
| 4,445,915 A | 5/1984 | Robinson |
| 4,560,477 A | 12/1985 | Moldow |
| 4,632,680 A | 12/1986 | Klimczak |
| 4,663,041 A | 5/1987 | Miyagi et al. |
| 4,732,678 A | 3/1988 | Humbert, Jr. |
| 4,786,293 A | 11/1988 | Labadie |
| 4,813,985 A | 3/1989 | Brennecke et al. |
| 4,878,930 A | 11/1989 | Manniso et al. |
| 4,929,354 A | 5/1990 | Meyering et al. |
| 4,954,255 A | 9/1990 | Müller et al. |
| 5,027,665 A * | 7/1991 | Hayward ................ 74/18.1 |
| 5,074,896 A | 12/1991 | Baert et al. |
| 5,094,675 A | 3/1992 | Pitt et al. |
| 5,207,811 A | 5/1993 | Buonpastore |
| 5,207,812 A | 5/1993 | Tronto et al. |
| 5,211,846 A | 5/1993 | Kott et al. |
| 5,222,488 A | 6/1993 | Forsgren |
| 5,242,472 A | 9/1993 | Sellakumar |
| 5,290,441 A | 3/1994 | Griffin et al. |
| 5,290,446 A | 3/1994 | Degen et al. |
| 5,308,369 A | 5/1994 | Morton et al. |
| 5,336,405 A | 8/1994 | Tang et al. |
| 5,395,409 A | 3/1995 | Klimczak et al. |
| 5,439,494 A | 8/1995 | Tullis et al. |
| 5,746,792 A | 5/1998 | Clements et al. |
| 5,837,017 A | 11/1998 | Santschi et al. |
| 5,845,911 A * | 12/1998 | Gimino ................ 277/636 |
| 5,904,743 A | 5/1999 | Jensen |
| 6,203,591 B1 | 3/2001 | Clements et al. |
| 6,726,735 B1 | 4/2004 | Oussoren |
| 7,341,616 B2 | 3/2008 | Taylor et al. |

FOREIGN PATENT DOCUMENTS

| | | |
|---|---|---|
| EP | 0160168 A2 | 11/1985 |
| EP | 0213930 A2 | 3/1987 |
| EP | 0520737 A1 | 12/1992 |
| GB | 242388 A | 11/1925 |
| GB | 636439 A | 4/1950 |
| GB | 840570 A | 7/1960 |
| GB | 990587 A | 4/1965 |
| GB | 1016556 A | 1/1966 |
| GB | 1081516 A | 8/1967 |
| JP | 61141911 A | 6/1986 |
| WO | 8505286 A1 | 12/1985 |

* cited by examiner

VENTURI ADAPTER

BACKGROUND OF THE INVENTION

The subject matter disclosed herein relates to a venturi adapter.

In collectors for various applications, cleaning systems are often designed to use bag and cage filtration with high blow pipes, venturi sleeves and filter bag assemblies disposed within a cleaning box having a clean air upper region and a dirty lower region separated by a tubesheet. In operation, inflow is provided to the dirty lower region of the cleaning box by a blower and carries with it particulate matter that adheres to the filter bag assemblies as cleaned air moves toward the clear air upper region. Eventually, the filter bag assemblies become clogged and require cleaning. This cleaning can be accomplished by the use of cleaning pulses that are applied to the filter bag assemblies by the high blow pipes via the venturi sleeves.

The venturi sleeves are typically sleeves having a wide inlet, a wide outlet and a narrow midsection and are utilized to transport the cleaning pulses to the filter bag assemblies whereby the venturi effect provided by the narrow midsection maintains the force of those pulses along the length of the venturi sleeves. Thus, when the cleaning pulses reach the filter bag assemblies, the collected particulate matter is forcibly removed from the filter media and deposited at a bottom of the dirty lower region of the cleaning box where it is removed by other processes.

Recently, collector systems manufacturers have begun converting to pleated filtration products, such as pleated bags. Pleated bags typically provide increased filtering surface area as compared to non-pleated bags but are often incompatible with venturi adapters designed for use with non-pleated bags. As such, it is often the case that venturi adapters will not be usable in conjunction with new filter assemblies. This can lead to a loss of the venturi effect and may result in inadequate cleaning.

BRIEF DESCRIPTION OF THE INVENTION

According to an aspect of the invention, a venturi adapter is provided and includes a first collar having an inward projection, a second collar having an outward projection and a shoulder defining an aperture extending between opposing axial faces thereof and having an axial projection, the first and second collars extending in opposing axial directions from the shoulder.

According to one aspect of the invention, a venturi adapter is provided and includes a first collar having an inward projection and deformation capability, a second collar having an outward projection and deformation capability and a shoulder defining an aperture extending between opposing axial faces thereof and having an axial projection and deformation capability, the first and second collars extending in opposing axial directions from the shoulder and combined deformation capabilities of the first collar and the shoulder oppose combined deformation capabilities of the second collar and the shoulder.

According to yet another aspect of the invention, a method of converting a bag assembly to a cartridge assembly in a bag house cleaning system is provided and includes fluidly coupling a high blow pipe and a venturi sleeve, positioning the high blow pipe and the venturi sleeve above a filter element, and sealably disposing a venturi adapter between a lower part of the venturi sleeve and an upper part of the filter element.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
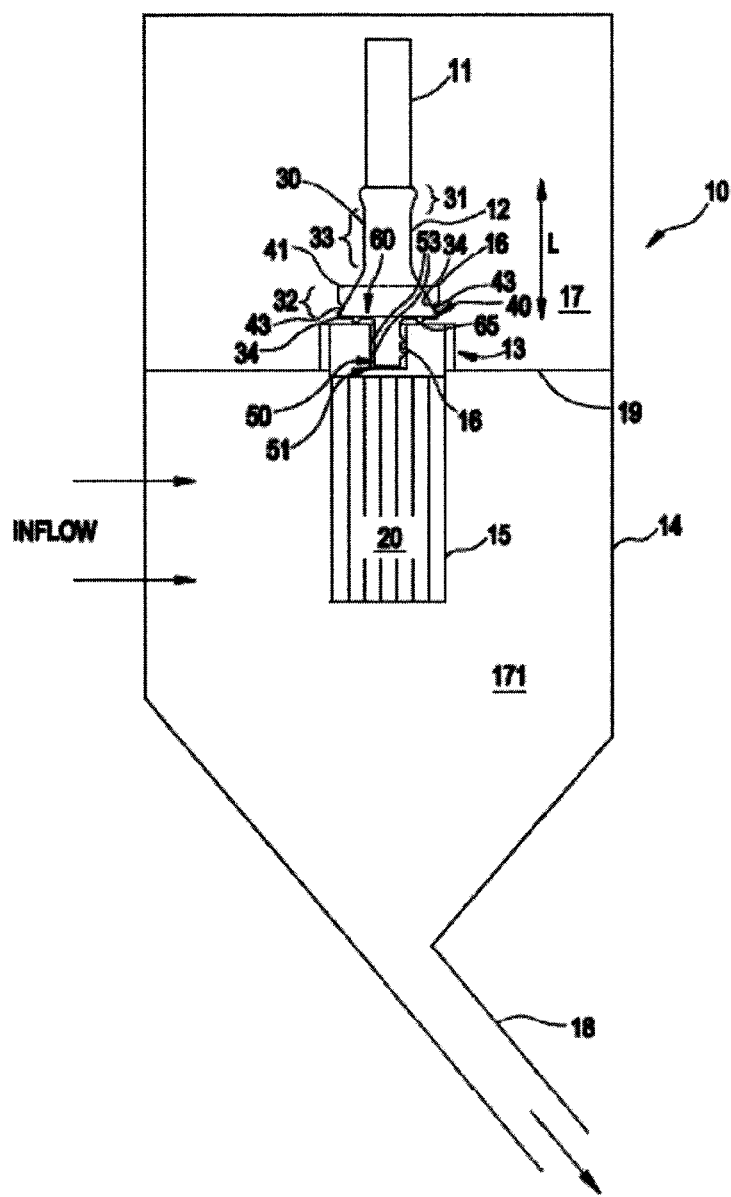
FIG. 1 is a schematic view of a cleaning system.

With reference to FIG. 1, a bag house cleaning system 10 is provided and is designed to use bag and cage filtration with a high blow pipe 11, a venturi sleeve 12 and a filter cartridge assembly 13 disposed within a cleaning box 14. The filter cartridge assembly 13 includes a filter element 15, such as a pleated filter, and a venturi adapter 16, which mates with an upper part of the filter element 15 and a lower part of the venturi sleeve 12. The cleaning box 14 has a clean air upper region 17 and a dirty lower region 171 that empties into an outlet conduit 18. The clean air upper region 17 and the dirty lower region 171 are separated from one another by a tubesheet 19 through which the filter element 15 extends substantially vertically.

In operation, inflow of air or fluid is provided to the dirty lower region 171 by a blower, a pump, a fan or a similar type of device and carries with it particulate matter that adheres to the filter element 15 as cleaned air moves toward the clear air upper region 17. Eventually, the pleated filter media 20 of the filter element 15 becomes clogged with collected particulate matter and requires cleaning, which is accomplished by the use of cleaning pulses that are applied to the filter element 15 by the high blow pipe 11 via the venturi sleeve 12.

The venturi sleeve 12 includes a sleeve body 30 having a wide inlet 31, a wide outlet 32 and a narrow midsection 33 and further includes a flange 34 at the outlet 32. The venturi sleeve 12 is utilized to transport the cleaning pulses from the high blow pipe 11 to the filter element 15 whereby the venturi effect provided by the narrow midsection 33 maintains the force of those pulses along the length, L, of the sleeve body 30. Thus, when the cleaning pulses reach the filter element 15, the collected particulate matter is forcibly removed from the filter media 20 by the cleaning pulses and deposited at the bottom of the dirty lower region 171 of the cleaning box 14 where it is removed by other processes through the outlet conduit 18.

As shown in FIG. 1, the venturi adapter 16 mates with an upper part of the filter element 15 and a lower part of the venturi sleeve 12 such that the venturi sleeve 12 and the filter element 15 can be coupled to one another and the respective interiors of each can be thereby disposed in fluid communication.

Figure 2:
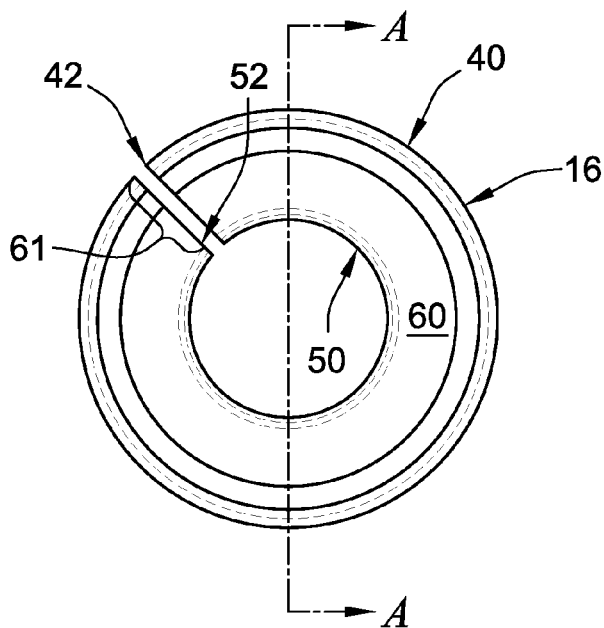
FIG. 2 is an axial view of a venturi adapter for the cleaning system of FIG. 1.
Figure 3:
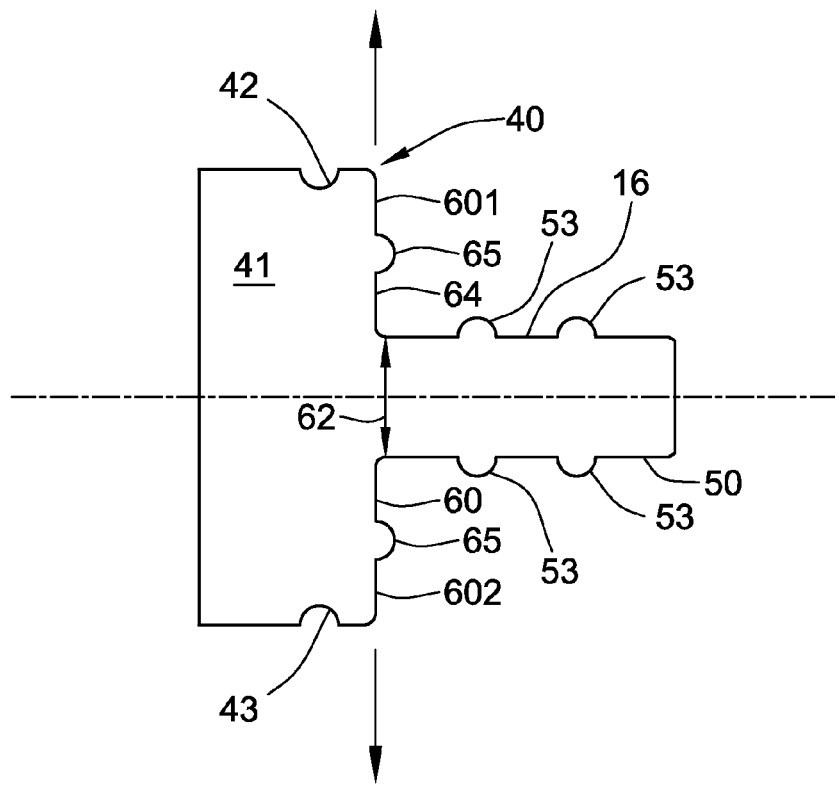
FIG. 3 is a cross sectional view of the venturi adapter of FIG. 2 taken along line A-A of FIG. 2.

With reference to FIGS. 2 and 3, the venturi adapter 16 includes a first annular portion of a collar 40, a second annular portion of the collar 50 and a shoulder portion of the collar 60

(hereinafter referred to as a "first annular collar 40," a "second annular collar 50" and a "shoulder 60"). The first annular collar 40 is formed to define a first receiving section 41 into which the lower part of the venturi sleeve 12 is receivable and has deformation capability. The deformation capability of the first annular collar 40 may be radial deformation capability that permits a radial expansion of the first annular collar 40, which is associated with reception of the lower part of the venturi sleeve 12 in the first receiving section 41, and may be provided by formation of a first longitudinal slot 42. The first annular collar 40 also has a first inward projection 43 that projects from an inwardly facing surface thereof in a radially inward direction toward the first female section 41. The first inward projection 43 therefore impinges upon an outer surface of the lower part of the venturi sleeve 12 received in the first female section 41 to secure the venturi sleeve 12 therein. In accordance with an embodiment, the first projection 43 may particularly impinge upon the outer surface of the flange 34 at the outlet 32 of the venturi sleeve 12.

The second annular collar 50 is formed to be receivable in a receiving section 51 of the upper part of the filter element 15 (see FIG. 1) and has deformation capability. The deformation capability of the second annular collar 50 may be radial deformation capability that permits a radial contraction of the second annular collar 50, which is associated with reception of the second annular collar 50 in the receiving section 51, and may be provided by formation of a second longitudinal slot 52. The second annular collar 50 also has a second outward projection 53, which may be plural in number, and which projects from an outwardly facing surface thereof in a radially outward direction. The second outward projection 53 therefore impinges upon an inner surface of the filter element 15 at the female section 51 to secure the second annular collar 50 of the venturi adapter 16 therein.

The shoulder 60 also has deformation capability that also may be radial deformation capability that permits radial expansion of the shoulder 60 proximate to the first annular collar 40 and radial contraction of the shoulder 60 proximate to the second annular collar 50 and may be provided by formation of a third longitudinal slot 61. The shoulder 60 is further formed to have a central longitudinal axis and to define an aperture 62 extending between opposing first and second axial faces 63, 64 of the shoulder 60. The shoulder 60 also has an axial annular projection 65 that projects from the second axial face 64 in an axial direction. The first annular collar 40 extends from an outer radial section 601 of the shoulder 60 in a first axial direction and the second annular collar 50 extends from an inner radial section 602 of the shoulder 60 in a second axial direction that is opposite the first axial direction. The outer radial section 601 has a plane (see FIG. 3) and is defined along the radial dimension (see FIG. 3), where the radial dimension is defined relative to and extends radially outwardly from the central longitudinal axis. The inner radial section 602 is coplanar with the outer radial section 601. The second annular collar 50 and the axial annular projection 65 extend in similar axial directions.

With this construction, combined deformation capabilities of the first annular collar 40 and the shoulder 60 and the combined deformation capabilities of the second annular collar 50 and the shoulder 60 oppose one another. In particular, where the deformation capabilities are respectively provided by the first, second and third longitudinal slots 42, 52 and 61, the first, second and third longitudinal slots 42, 52 and 61 may be circumferentially aligned and longitudinally continuous.

The longitudinal slots 42, 52 and 61 permit selective inward and outward radial deformation of the venturi adapter 16. That is, when the venturi sleeve 12 is received in the first female section 41, the first annular collar 40 radially expands as permitted by the longitudinal slots 42 and 61 and the venturi sleeve 12 is therefore press-fittable into the first female section 41. By contrast, when the second annular collar 50 is received in the female section 51 of the filter element 15, the second annular collar radially contracts as permitted by the longitudinal slots 52 and 61 and the second annular collar 50 is therefore press-fittable into the female section 51.

The radial expansion at the first annular collar 40 and the radial contraction at the second annular collar 50 work in opposition to tighten the venturi adapter 16 between the venturi sleeve 12 and the filter element 15. In a similar manner, the radial stress applied outwardly by the venturi sleeve 12 to the first annular collar 40 and the radial stress applied inwardly by the filter element 15 to the second annular collar 50 also work in opposition to tighten the venturi adapter 16 between the venturi sleeve 12 and the filter element 15.

The first projection 43, the second projection 53 and the axial annular projection 65 are each annular and extend circumferentially around the first annular collar 40, the second annular collar 50 and the aperture 62 of the shoulder 60. The first projection 43, the second projection 53 and the axial annular projection 65 are therefore single features although it is to be understood that this is merely exemplary and that other configurations are possible. For example, the first projection 43, the second projection 53 and the axial annular projection 65 could each be provided as multiple individual peaks or buttons. Also, where the second projection 53 is plural in number, each plural second projection 53 may be provided as a single feature or as multiple individual peaks or buttons.

In accordance with embodiments, the first and second annular collars 40 and 50 and the aperture 62 may be substantially concentric with respect to one another. In addition, respective diameters of the second annular collar 50 and the aperture 62 may be substantially similar. Thus, when the venturi sleeve 12, the filter element 15 and the venturi adapter 16 are assembled together, cleaning pulses at maintained force are transmitted through the venturi sleeve 12, the aperture 62 and into the filter element 15 where they forcibly remove collected particulate matter form the pleated filter media 20.

In accordance with further aspects, a method of converting a bag assembly to a cartridge assembly in a bag house cleaning system 10 is provided. The method includes fluidly coupling a high blow pipe 11 and a venturi sleeve 12 so that cleaning pulses generated by the high blow pipe 11 are transmitted through the venturi sleeve 12, positioning the high blow pipe 11 and the venturi sleeve 12 above a filter element 15 and sealably disposing a venturi adapter 16 between a lower part of the venturi sleeve 12 and an upper part of the filter element 15. As described above, the sealably disposing includes receiving the lower part of the venturi sleeve 12 in a first annular collar 40 of the venturi adapter 16 and receiving a second annular collar 50 of the venturi adapter 16 in the upper part of the filter element 15 whereby deformation of the venturi adapter 16, which is associated with the receiving of the lower part of the venturi sleeve 12, opposes deformation of the venturi adapter 16, which is associated with the receiving of the second annular collar 50.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A venturi adapter apparatus, comprising:
   a collar constructed of one piece;
   a first portion of the collar having an inward projection;
   a second portion of the collar having an outward projection; and
   a shoulder portion of the collar having a central longitudinal axis and including an outer radial section oriented along a radial dimension, where the radial dimension is defined relative to and extends radially outwardly from the central longitudinal axis, the outer radial section having a plane and being coupled to the first portion of the collar, an inner radial section coplanar with the plane of the outer radial section and coupled to the second portion of the collar and an axial projection,
   the inner radial section defining an aperture,
   the axial projection being radially interposed between the inner and outer radial sections and configured to protrude from the plane of the inner and outer radial sections in an axial direction relative to the central longitudinal axis, and
   the first and second portions of the collars extending in opposing axial directions relative to the central longitudinal axis from the shoulder portion of the collar,
   the venturi adapter apparatus further comprising a first tool, wherein deformation capabilities of the first portion of the collar, the second portion of the collar and the shoulder portion of the collar are provided by a slot comprising circumferentially aligned and longitudinally continuous first, second and third longitudinal slot portions formed therein in relation to the central longitudinal axis, the first portion of the collar being annular in shape and formed to define a receiving section receptive of the first tool, which is configured to be press-fit into the receiving section of the first portion of the collar with respective opposing edges of the first, second and third longitudinal slots remaining unattached to one another; and
   combined deformation capabilities of the first portion of the collar and the shoulder portion of the collar oppose combined deformation capabilities of the second portion of the collar and the shoulder portion of the collar.

2. A venturi adapter apparatus, comprising:
   a collar constructed of one piece;
   a first portion of the collar having an inward projection and deformation capability;
   a second portion of the collar having an outward projection and deformation capability;
   a shoulder portion of the collar having deformation capability and a central longitudinal axis and including an outer radial section oriented along a radial dimension, where the radial dimension is defined relative to and extends radially outwardly from the central longitudinal axis, the outer radial section having a plane and being coupled to the first portion of the collar, an inner radial section coplanar with the plane of the outer radial section and coupled to the second portion of the collar and an axial projection; and
   a first tool comprising a venturi sleeve, wherein the first portion of the collar is annular in shape and forms a receiving section receptive of the venturi sleeve,
   the inner radial section defining an aperture,
   the axial projection being radially interposed between the inner and outer radial sections and configured to protrude from the plane of the inner and outer radial sections in an axial direction relative to the central longitudinal axis,
   the first and second portions of the collars extending in opposing axial directions relative to the central longitudinal axis from the shoulder portion of the collar, and
   combined deformation capabilities of the first portion of the collar and the shoulder portion of the collar are provided by slot portions being formed therein and oppose combined deformation capabilities of the second portion of the collar and the shoulder portion of the collar, which are provided by the slot portion formed in the shoulder portion of the collar and by a slot portion formed in the second portion of the collar, the slot portions being circumferentially aligned and longitudinally continuous and forming a single slot; and
   the slot portions having respective opposing edges and the respective opposing edges of the slot portions remaining unattached to one another.

3. The adapter apparatus according to claim 2, wherein the second portion of the collar comprises a plurality of outward projections.

4. The adapter apparatus according to claim 2, wherein the axial projection comprises an annular projection.

5. The adapter apparatus according to claim 2, wherein the axial projection and the second portion of the collar extend from the plane of the inner and outer radial sections in the same axial directions.

6. The adapter apparatus according to claim 2, wherein the first and second portions of the collar and the aperture are substantially concentric.

7. The adapter apparatus according to claim 6, wherein respective diameters of the second portion of the collar and the aperture are substantially the same.

8. The adapter apparatus according to claim 2, wherein the first tool is configured to be press-fit into the receiving section of the first portion of the collar.

9. The adapter apparatus according to claim 8, wherein the inward projection extends circumferentially around the first portion of the collar to impinge against an outer surface of the first tool.

10. The adapter apparatus according to claim 2, wherein the second portion of the collar is annular in shape.

11. The adapter apparatus according to claim 10, further comprising a second tool, wherein the second portion of the collar is press-fittable into a receiving section of the second tool.

12. The adapter apparatus according to claim 11, wherein the outward projection extends circumferentially around the second portion of the collar to impinge against an inner surface of the second tool.

13. The adapter apparatus according to claim 11, wherein the second tool comprises a filter element.

* * * * *